(12) United States Patent
Billard (10) Patent No.: US 9,877,423 B2
(45) Date of Patent: Jan. 30, 2018

(54) AGRICULTURAL MACHINE, IN PARTICULAR A MACHINE FOR HARVESTING PLANTS, COMPRISING TWO DRIVEN WORK UNITS ARTICULATED TO A SAME LATERAL ARM

(71) Applicant: KUHN S.A., Saverne (FR)

(72) Inventor: Sylvain Billard, Reinhardsmunster (FR)

(73) Assignee: KUHN S.A., Saverne (FR)

( * ) Notice: Subject to any disclaimer, the term of this patent is extended or adjusted under 35 U.S.C. 154(b) by 21 days.

(21) Appl. No.: 15/032,148

(22) PCT Filed: Nov. 14, 2014

(86) PCT No.: PCT/FR2014/052900
§ 371 (c)(1),
(2) Date: Apr. 26, 2016

(87) PCT Pub. No.: WO2015/075356
PCT Pub. Date: May 28, 2015

(65) Prior Publication Data
US 2016/0255762 A1    Sep. 8, 2016

(30) Foreign Application Priority Data

Nov. 22, 2013  (FR) ..................................... 13 61494

(51) Int. Cl.
*A01B 73/04* (2006.01)
*A01B 73/06* (2006.01)
*A01D 34/66* (2006.01)

(52) U.S. Cl.
CPC .......... *A01B 73/044* (2013.01); *A01B 73/042* (2013.01); *A01B 73/06* (2013.01); *A01D 34/66* (2013.01)

(58) Field of Classification Search
CPC ..... A01B 73/02; A01B 73/005; A01B 73/046; A01B 73/048; A01B 73/044;
(Continued)

(56) References Cited

U.S. PATENT DOCUMENTS 4,738,461 A * 4/1988 Stephenson ............ B62D 13/00
                                                           180/14.4
4,768,334 A * 9/1988 Honey ................. A01B 73/005
                                                           56/15.2
(Continued)

FOREIGN PATENT DOCUMENTS

| DE | 196 46 495 A1 | 5/1997 |
| EP | 0 672 336 A1 | 9/1995 |
| EP | 1 175 819 A2 | 1/2002 |

OTHER PUBLICATIONS

International Search Report dated Feb. 27, 2015, in PCT/FR2014/052900 Filed Nov. 14, 2014.

*Primary Examiner* — Arpad Fabian-Kovacs
(74) *Attorney, Agent, or Firm* — Oblon, McClelland, Maier & Neustadt, L.L.P.

(57) ABSTRACT

An agricultural machine including a chassis carrying an arm including first and second ends, a first unit connected to the arm and extending laterally between the first and second ends, a second unit connected to the arm and extending laterally beyond the second end, a device connecting the second unit to the arm in vicinity of its second end and allowing it to swivel relative to the arm around a second longitudinal axis close to the second end, a mechanism driving elements of the first and second units and carried by the arm in vicinity of the second end. The device includes an axis oriented upwards during work around which the mechanism is mounted with swiveling action on the arm, and the (Continued)

mechanism and at least one of the first and second units can, in a lateral position of the arm relative to the chassis, jointly swivel around the axis.

16 Claims, 7 Drawing Sheets

(58) Field of Classification Search
CPC .. A01B 73/065; A01B 73/067; A01D 34/661; A01D 34/66; A01D 41/144
USPC .......................................................... 172/311
See application file for complete search history.

(56) References Cited

U.S. PATENT DOCUMENTS

| | | | | |
|---|---|---|---|---|
| 5,107,663 A * | 4/1992 | Wattron | ............... | A01D 34/661 56/15.7 |
| 6,109,012 A * | 8/2000 | Staal | ................... | A01D 78/1014 172/311 |
| 6,189,306 B1 * | 2/2001 | Walch | ................... | A01D 67/005 56/15.1 |
| 7,310,929 B2 * | 12/2007 | Dow | ....................... | A01B 73/02 172/311 |
| 7,658,056 B2 * | 2/2010 | Thompson | ............ | A01D 34/661 56/15.8 |
| 8,528,308 B2 * | 9/2013 | Priepke | ................ | A01D 34/661 172/311 |
| 9,173,345 B2 * | 11/2015 | Cressoni | ............... | A01D 41/144 |
| 9,198,341 B2 * | 12/2015 | Halter | ................... | A01B 73/044 |
| 9,198,357 B2 * | 12/2015 | Gantzer | ................. | A01D 84/00 |
| 2003/0182912 A1 * | 10/2003 | Boll | ..................... | A01D 34/661 56/14.7 |
| 2010/0037584 A1 * | 2/2010 | Dow | ....................... | A01B 73/02 56/376 |

\* cited by examiner

AGRICULTURAL MACHINE, IN PARTICULAR A MACHINE FOR HARVESTING PLANTS, COMPRISING TWO DRIVEN WORK UNITS ARTICULATED TO A SAME LATERAL ARM

BACKGROUND OF THE INVENTION

Field of the Invention

The present invention concerns an agricultural machine, in particular an agricultural machine for harvesting plants, comprising:
- a chassis that can be attached to a motor vehicle likely to move in a direction of advance;
- an arm connected to the chassis and extending between a first lateral end of the arm and a second lateral end of the arm;
- a first articulation device connecting the arm to the chassis in the vicinity of the first lateral end, this first articulation device allowing the arm to be moved relative to the chassis
  - between a work position, in which the arm extends laterally relative to the chassis;
  - and a transport position, in which the arm is swiveled relative to the chassis so that, perpendicularly to the direction of advance, it is smaller in size than in the work position;
- a first work unit connected to the arm and extending in particular, in the work position of the arm and in a direction perpendicular to the direction of advance, from the second lateral end towards the first lateral end;
- a second work unit connected to the arm and extending in particular, in the work position of the arm and in a direction perpendicular to the direction of advance and oriented from the first lateral end towards the second lateral end, from the second lateral end of the arm;
- a second articulation device carried by the arm in the vicinity of the second lateral end;
  - the second articulation device connecting the second work unit to the arm, in the vicinity of the second lateral end;
  - the second articulation device allowing the second work unit to swivel relative to the arm around a second geometric axis situated in the vicinity of the second lateral end and oriented, when the arm is in a work position, substantially in the direction of advance;
- a drive mechanism intended to drive work elements of the first and second work units, being notably carried by the arm in the vicinity of the second lateral end.

Description of the Related Art

Such a machine is known from the document EP 1 175 819 A2. On this machine, the first work unit can be articulated to the arm by means of an axis substantially oriented in the direction of advance. This axis is substantially situated midway between the first and second lateral ends of the arm. The first work unit extends between these first and second lateral ends. This first work unit comprises work elements that, during the work, are driven by a drive mechanism in particular carried by the arm in the vicinity of its second lateral end. This drive mechanism comprises a housing carried by the arm in the vicinity of its second lateral end and a transmission device extending at the front part of the housing, in the direction of the first work unit. With a view to following the movements of the first work unit around its articulation axis on the arm, this transmission device must include articulated and/or sliding linkages. However, such a transmission device increases the complexity and cost of the machine. Such a transmission device also requires regular maintenance and represents a source of failures. In addition, such a transmission device limits the swiveling amplitude of the first work unit around its articulation axis on the arm. Indeed, its articulated and/or sliding linkages have a range of angular variation and/or limited length. On this known machine, each work unit can swivel in a plane substantially perpendicular to the direction of advance. On the other hand, when the arm is in a work position, each work unit has a constant orientation in a substantially horizontal plane. The result is that this work unit is not able to evade an obstacle it encounters during work. In such an event, this work unit can therefore suffer serious damage.

BRIEF SUMMARY OF THE INVENTION

The aim of the present invention is to propose an agricultural chine, in particular an agricultural machine for harvesting plants, that does not present the aforementioned drawbacks.

To this end, the invention is in particular characterised by the fact that:
- the second articulation device connects the first work unit to the arm, in the vicinity of the second lateral end;
- the second articulation device allows, during work, the first work unit to swivel relative to the arm around a first geometric axis situated in the vicinity of the second lateral end and oriented, when the is in work position, substantially in the direction of advance.

As such, the first work unit is connected to the arm in the vicinity of the drive mechanism. The first geometric axis around which the first work unit can swivel relative to the arm is situated in the vicinity of the drive mechanism. With a simple and inexpensive drive mechanism; this arrangement enables a significant swiveling amplitude of the first work unit around the first geometric axis. During work; this first work unit can faithfully follow the relief of the ground on which the machine is moving. The proximity of the drive mechanism and the first geometric axis makes it possible to reduce the number of degrees of freedom of the transmission of movement to the work elements of the first work unit. It is in particular possible to eliminate a sliding linkage in the transmission of movement from the arm to the work elements of the first work unit.

The invention is also characterised by the fact that:
- the second articulation device comprises a swivel pin oriented upwards in the work position of the arm;
- the drive mechanism has a swiveling on the arm around the swivel pin;
- the drive mechanism and at least one of the first and second work units can, in a position of the arm in which the arm extends laterally relative to the chassis, jointly swivel around the said swivel pin.

The possible swiveling of the said at least one of the first and second work units around the swivel pin enables this work unit to move backwards if it encounters an obstacle. The said at least one of the first and second work units is thereby protected from significant damage. In addition, the swivel mounting of the drive mechanism on the arm around the swivel pin and its swiveling with the said at least one of the first and second work units around the swivel pin greatly simplify the drive mechanism. This is because the latter does not have to include a multitude of articulations and/or a sliding linkage in the transmission of movement to the work elements of the said work unit to enable the latter to swivel around the swivel pin.

The simplicity of the drive mechanism enabled by the invention improves the reliability of the machine and reduces the maintenance.

BRIEF DESCRIPTION OF THE SEVERAL VIEWS OF THE DRAWINGS

Other features and advantages of the invention will become clear from the following description, along with references to the attached drawings, which show a non-limiting example embodiment of the machine according to the invention.

In these drawings.

DETAILED DESCRIPTION OF THE INVENTION

Figure 1:
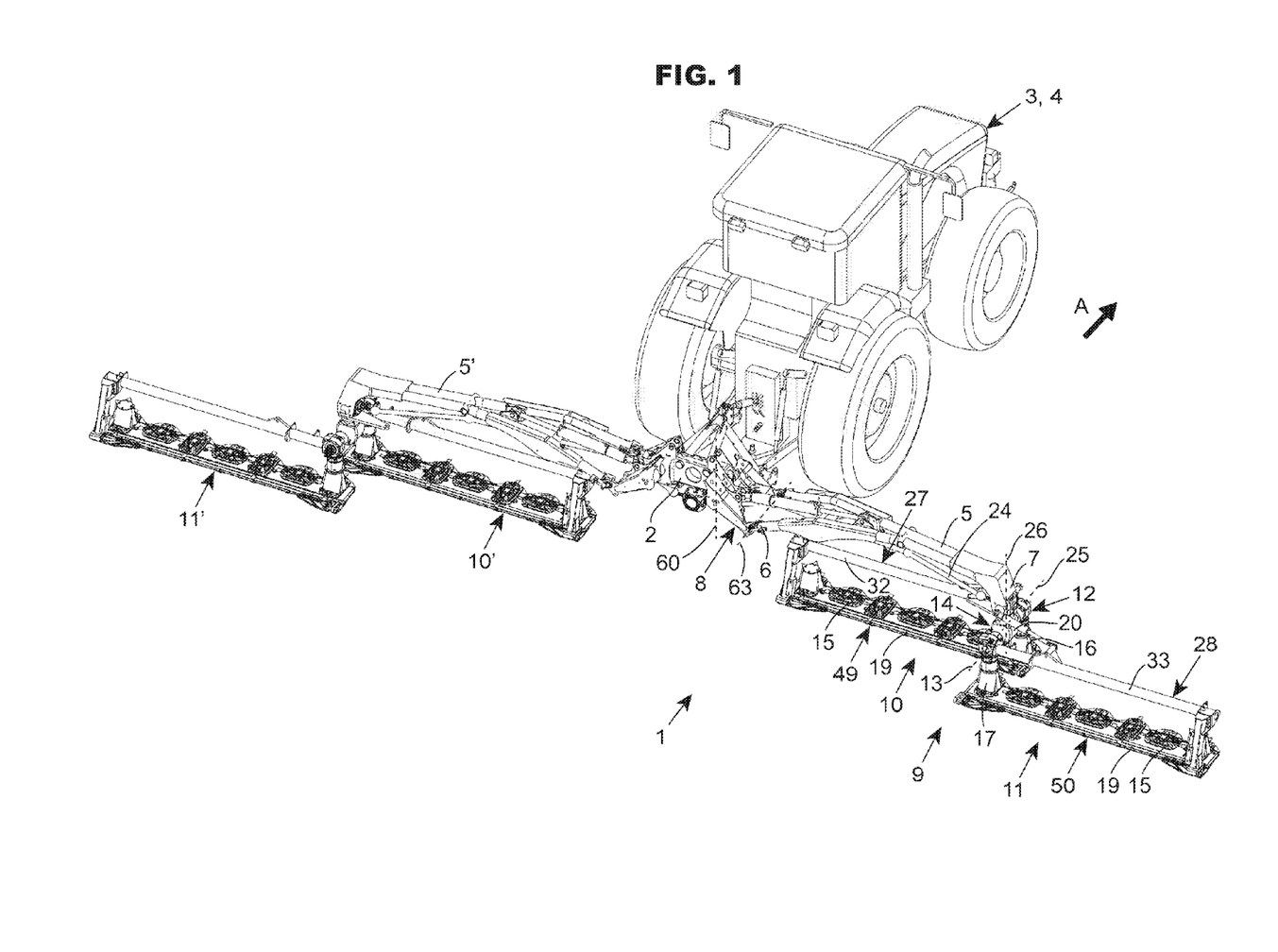
FIG. 1 shows a perspective view of an example embodiment of a machine according to the invention hitched to a tractor.
Figure 2:
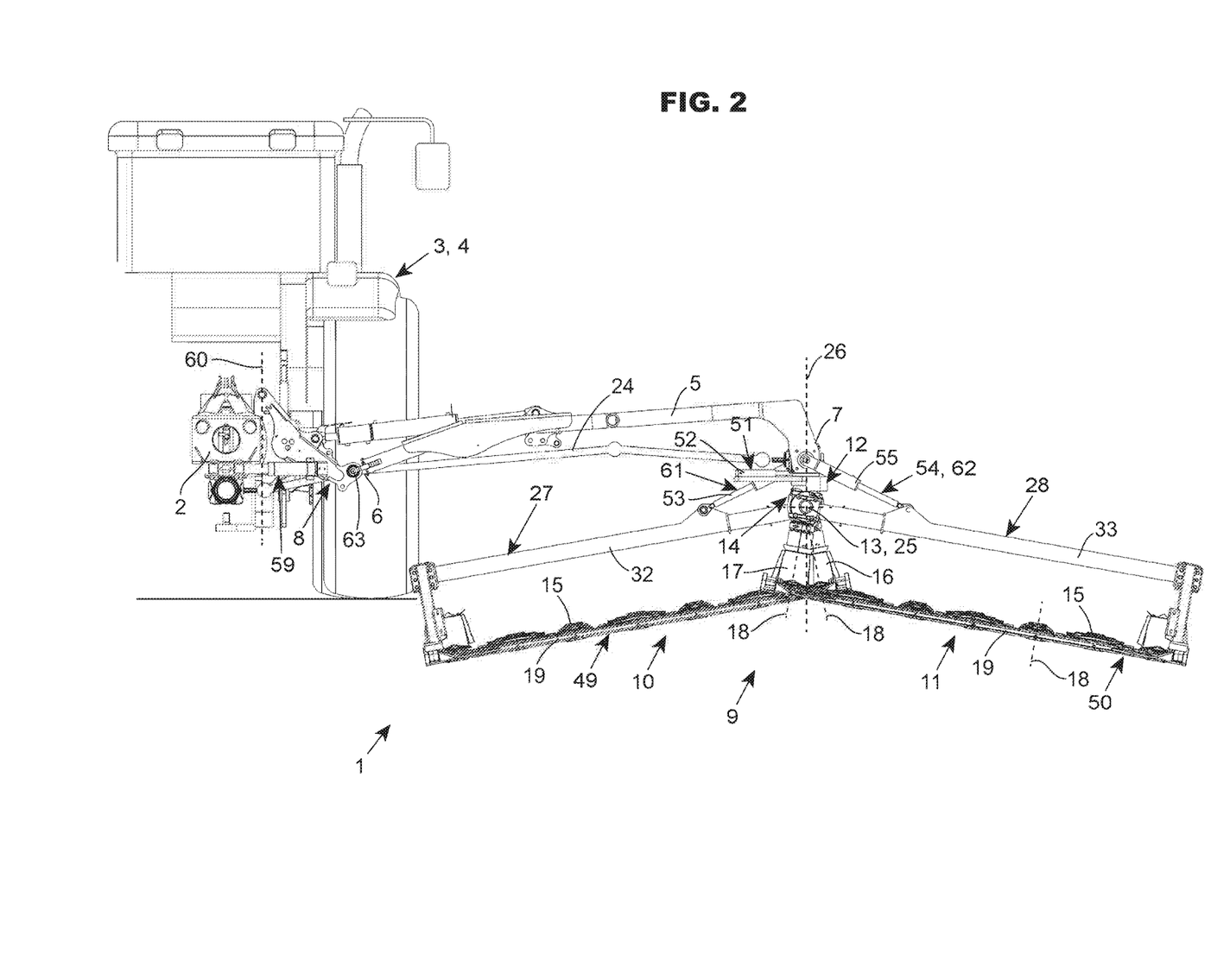
FIG. 2 shows a view from the rear of the example embodiment.
Figure 3:
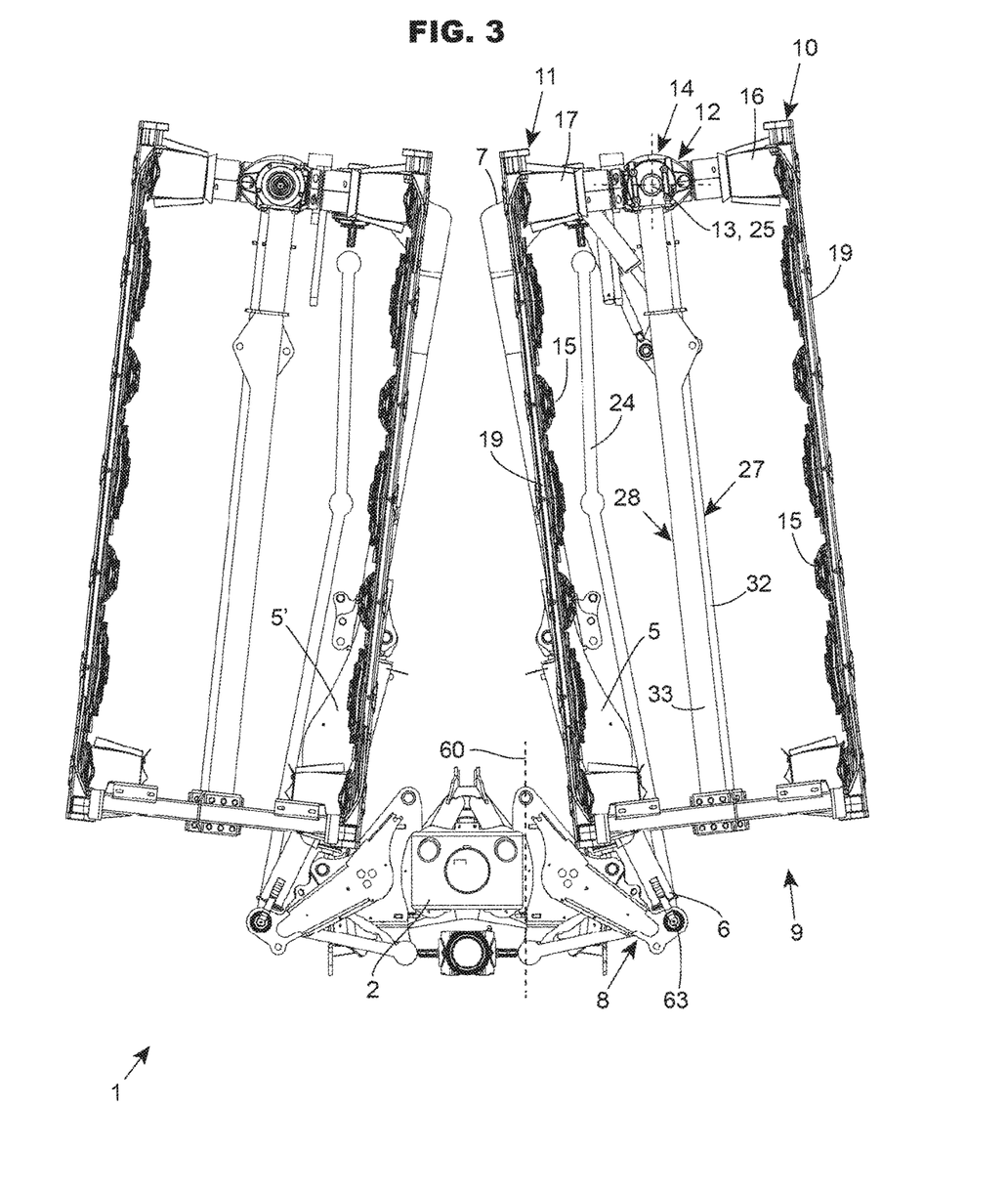
FIG. 3 shows another view from the rear of the example embodiment.

As shown in FIG. 1, the machine (1) according to the invention is an agricultural machine for harvesting plants, in particular forage. This machine (I) comprises a chassis (2). The chassis (2) is designed to be attached to a motor vehicle (3) likely to move in a direction of advance (A). In the remainder of the description, the notions "forwards", "backwards" and "behind" are defined relative to the direction of advance (A), while the notions "upwards" and "downwards" are defined relative to the ground. According to the example embodiment in FIG. 1, the chassis (2) is designed to be hitched to the coupling device of a tractor (4), in particular the coupling device situated at the rear of the tractor (4). The machine (1) also comprises an arm (5) connected to the chassis (2). The arm (5) extends between a first lateral end (6) of the arm (5) and a second lateral end (7) of the arm (5). The arm (5) is, in the vicinity of the first lateral end (6), connected to the chassis (2) by a first articulation device (8). The first articulation device (8) allows the arm (5) to be moved relative to the chassis (2) between a work position and a transport position. In the work position in FIGS. 1 and 2, the arm (5) extends laterally relative to the chassis (2). According to the example embodiment in the figures, in the work position, the arm (5) extends substantially perpendicularly to the direction of advance (A). At least in the work position, the first lateral end (6) of the arm (5) is situated in the vicinity of the chassis (2), while the second lateral end (7) is situated at a greater distance from the chassis (2). According to the example embodiment, in the work position of the arm (5), the second lateral end (7) extends outside the path of the motor vehicle (3) constituted by a tractor (4). In the transport position of the arm (5) shown in FIG. 3, the latter swivels relative to the chassis (2) so that, perpendicularly to the direction of advance (A), it is smaller in size than in the work position. The machine (1) comprises a work mechanism (9). The work mechanism (9) in particular comprises a first work unit (10) connected to the arm (5). In the work position of the arm (5), this first work unit (10) extends in particular, in a direction perpendicular to the direction of advance (A), from the second lateral end (7) of the arm (5) towards the first lateral end (6). According to a rear view of the machine (1) during work, shown in FIG. 2, the first work unit (10) extends in particular between the first and second lateral ends (6 and 7) of the arm (5). According to this same rear view, the first work unit (10) essentially extends between the first and second lateral ends (6 and 7) of the arm (5). According to the example embodiment, in the work position of the arm (5), the first work unit (10) primarily extends between the path of the motor vehicle (3) and the second lateral end (7) of the arm (5). During work, the first work unit (10) extends substantially perpendicularly to the direction of advance (A). The work mechanism (9) also comprises a second work unit (11) connected to the arm (5). In the work position of the arm (5), this second work unit (11) extends in particular, in a direction perpendicular to the direction of advance (A) and oriented from the first lateral end (6) towards the second lateral end (7), from the second lateral end (7) of the arm (5). According to the rear view of the machine (1) during work, shown in FIG. 2, the second work unit (11) extends in particular from the second lateral end (7) of the arm (5) and primarily beyond the arm (5). According to this same rear view, the second work unit (11) extends as a continuation of the first work unit (10). During work, the second work unit (11) extends substantially perpendicularly to the direction of advance (A). The machine (1) also comprises a second articulation device (12) carried by the arm (5) in the vicinity of the second lateral end (7) of the latter. The second articulation device (12) connects the second work unit (11) to the arm (5) in the vicinity of the second lateral end (7). The second work unit (11) is therefore carried by the arm (5) substantially at the level of the second lateral end (7) of the arm (5). The second articulation device (12) allows the second work unit (11) to swivel relative to the arm (5) around a second geometric axis (13) situated in the vicinity of the second lateral end (7) and oriented, when the arm (5) is in a work position, substantially in the direction of advance (A). In particular during work, the second work unit (11) can swivel around the second geometric axis (13) so as to follow the relief of the ground. The machine (1) also comprises a drive mechanism (14) intended to drive work elements (15, 16, 17) of the first and second work units (10 and 11). This drive mechanism (14) is in particular carried by the arm (5) in the vicinity of the second lateral end (7).

Each work unit (10, 11) is a plant harvesting unit. Each work unit (10, 11) comprises at least one work element (15, 16, 17). According to the example embodiment, a work element (15, 16, 17) is a cutting element intended to cut the plants. The cutting element is for example a cutting rotor that can turn around a rotation axis (18) that, during work, is substantially vertical or slightly tilted forwards. This cutting rotor is formed of a disc or drum fitted with knives that extend beyond the periphery of the said disc or drum. The different work elements (15, 16, 17) of a work unit (10, 11) are mounted on bearings arranged at more or less regular intervals on a bar (19) and are, during operation, rapidly rotated by means of a train of gears incorporated into a sealed casing containing a lubricant such as oil. When they are driven in rotation, the knives of a cutting rotor cut the plants that protrude above the soil.

During work, a partial covering is provided between the working width of the first work unit (10) and the working width of the second work unit (11). The first work unit (10) comprises at least a first work element (16). The second work unit (11) comprises at least a second work element (17). According to the example embodiment shown in FIGS. 1 and 2, the first work element (16) is located, perpendicular to the direction of advance (A), at the level of the second lateral end (7) of the arm (5). According to this example embodiment, the second work element (17) is located, perpendicular to the direction of advance (A), at the level of the second lateral end (7) of the arm (5). A first working width of the first work element (16) covers, at least partially, a second working width of the second work element (17). The first and second working widths are substantially identical. Each working width of a respective work unit (10, 11) is a continuous working width. The work mechanism (9) has a continuous working width. In addition, at least during work, the first and second work units (10 and 11) are offset relative to each other in the direction of advance (A). One (11) of the first and second work units (10 and 11) is situated immediately behind the other (10) of the first and second work units (10 and 11). During work, at least one work element (16) of the first work unit (10) and at least one work element (17) of the second work unit (11) are situated one behind the other and at a short distance from each other. According to the example embodiment in the figures, the first work element (16) and the second work element (17) are situated one behind the other and at a short distance from each other. In the direction of advance (A), the value of the distance of the first and second work elements (16 and 17) from each other is lower than their working widths.

Figure 4:
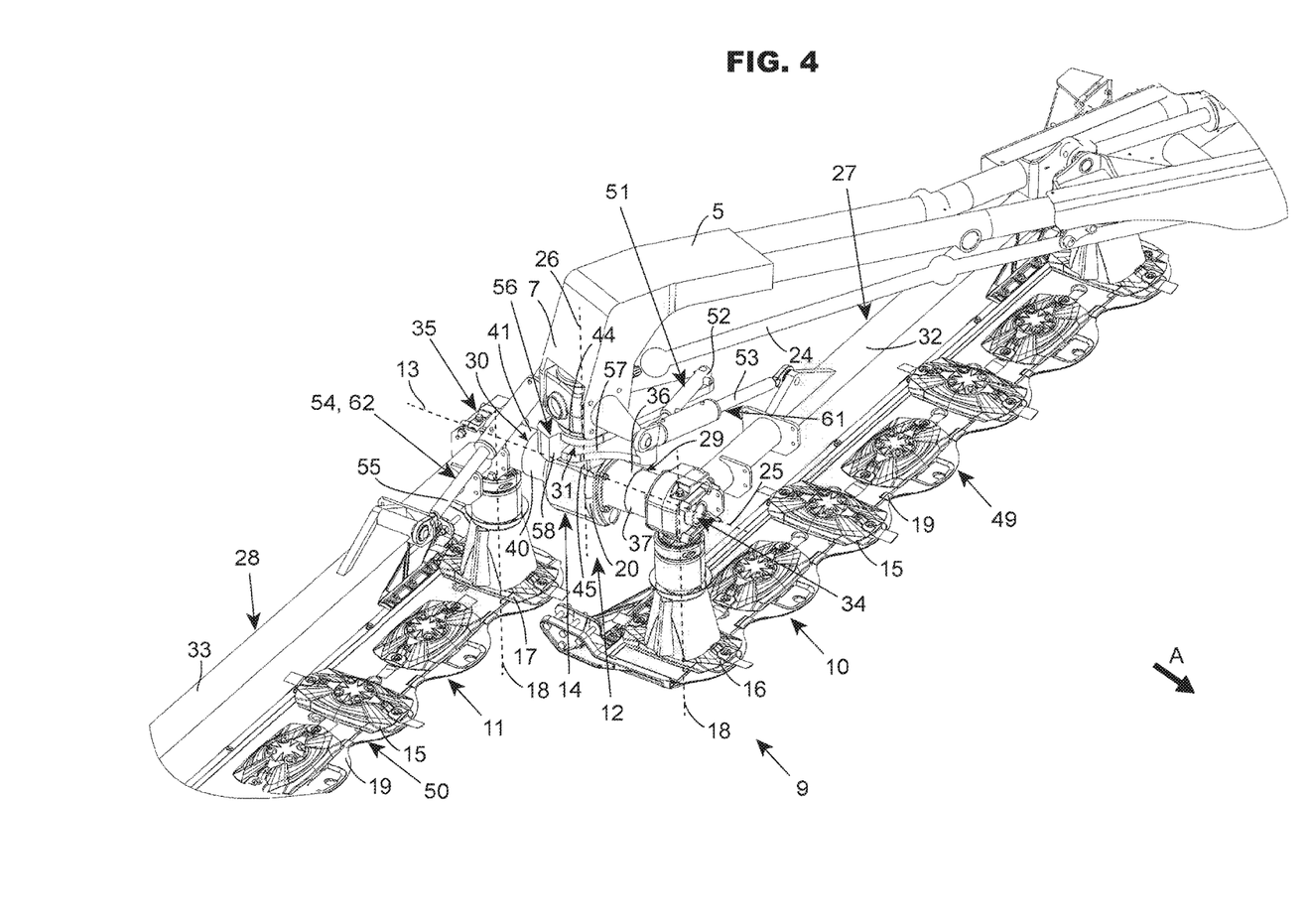
FIG. 4 shows a detailed perspective view of the example embodiment.
Figure 5:
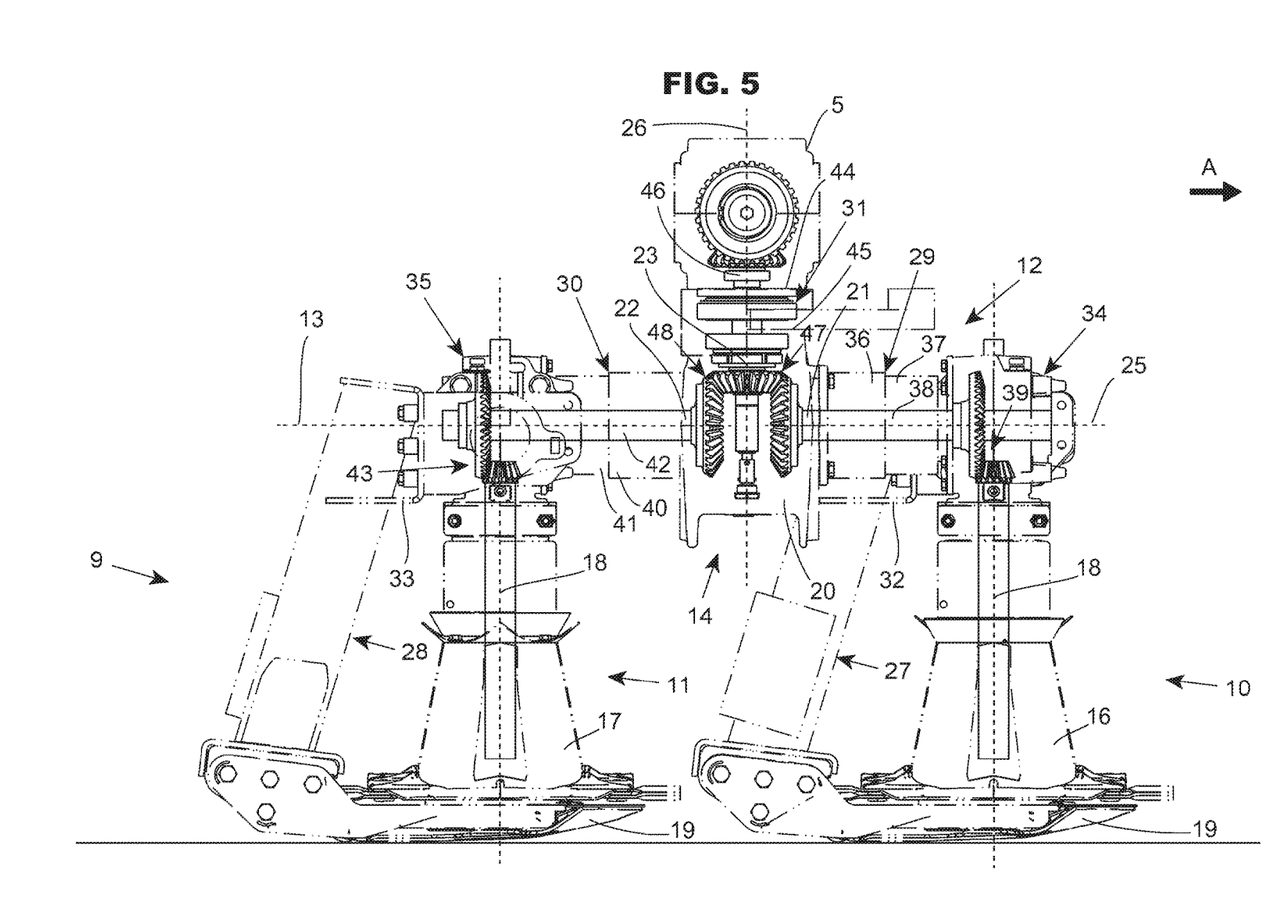
FIG. 5 shows another detailed perspective view of the example embodiment.

According to the example embodiment shown in more detail in FIGS. 4 and 5, the drive mechanism (14) comprises a housing (20) carried by the arm (5) in the vicinity of the second lateral end (7). This housing (20) comprises a first outlet (21) towards at least one work element (16) of the first work unit (10). The housing (20) also comprises a second outlet (22) towards at least one work element (17) of the second work unit (11). According to the example embodiment, the first outlet (21) drives the first work element (16) placed at the level of the second lateral end (7) of the arm (5). In addition, the second outlet (22) drives the second work element (17) placed at the level of the second lateral end (7) of the arm (5). The first work element (16) transmits its rotational movement to the other work elements (15) of the first work unit (10) by means of a train of gears housed in the casing of the first work unit (10). Similarly, the second work element (17) transmits its rotational movement to the other work elements (15) of the second work unit (11) by means of a train of gears housed in the casing of the second work unit (11). The housing (20) is connected to a motor means making it possible to set the work elements (15, 16, 17) of the first and second work units (10 and 11) in motion. The motor means may be situated on the motor vehicle (3) or on the machine (1) itself. According to the example embodiment shown in FIG. 5, the housing (20) comprises an inlet (23) connected to the motor means. This inlet (23) is connected to a first transmission shaft (24) shown in simplified form in FIG. 4 and extending along the arm (5) in the direction of the chassis (2). This first transmission shaft (24) is set in motion using the motor means constituted by the power take-off of the tractor (4).

The invention is in particular characterised by the fact that the second articulation device (12) connects the first work unit (10) to the arm (5) in the vicinity of the second lateral end (7) of the arm (5). Furthermore, the second articulation device (12) allows, during work, the first work unit (10) to swivel relative to the arm (5) around a first geometric axis (25), in particular to follow the relief of the ground. This first geometric axis (25) is situated in the vicinity of the second lateral end (7) of the arm (5). The first geometric axis (25) is situated, perpendicular to the direction of advance (A), at the level of the second lateral end (7). When the arm (5) is in a work position, the first geometric axis (25) is substantially oriented in the direction of advance (A). The proximity of the first geometric axis (25) and the drive mechanism (14), both placed in the vicinity of the second lateral end (7) of the arm (5), allow a large amplitude swiveling of the first work unit (10) relative to the arm (5), in particular during work. The amplitude of this swiveling is not limited by the drive mechanism (14).

The invention is also characterised by the fact that the second articulation device (12) comprises a swivel pin (26) oriented upwards in the work position of the arm (5). In addition, the drive mechanism (14) has a swivel mounting on the arm (5) around the swivel pin (26). Lastly, the drive mechanism (14) and at least one of the first and second work units (10 and 11) can, in a position of the arm (5) iii which the arm (5) extends laterally relative to the chassis (2), jointly swivel around the swivel pin (26). This joint swiveling can in particular take place when the arm (5) is in work position. The mounting of at least one of the first and second work units (10 and 11) around the substantially vertical swivel pin (26) enables this work unit (10, 11) to move backwards if it collides with an obstacle, without suffering significant damage. In this case, the related swiveling of the drive mechanism (14) prevents the impacts and jolts experienced by the work unit (10, 11) from being transmitted to the moving parts of the drive mechanism (14). The reliability of the drive mechanism (14) is improved as a result.

According to an advantageous feature of the invention:

the said at least one of the first and second work units (10 and 11) comprises a frame (27, 28);

the frame (27, 28) carries at least one work element (15, 16, 17) that can be driven in rotation relative to the frame (27, 28) by means of the drive mechanism (14) and around a rotation axis (18) that remains, during work, at least substantially immobile relative to the frame (27, 28);

the frame (27, 28) is carried by the arm (5), in an articulated manner, by means of a first bearing (29, 30) connected to the frame (27, 28) and having as its axis the corresponding first or second geometric axis (25, 13) of the said at least one of the first and second work units (10 and 11), and of a second bearing (31) connected to the first bearing (29, 30) and the arm (5) and having as its axis the swivel pin (26).

The said at least one of the first and second work units (10 and 11) is thereby articulated to the arm (5) via two bearings (29 and 31, 30 and 31) positioned one after the other and between the arm (5) and the corresponding frame (27, 28). Such an arrangement is simple and inexpensive.

The first work unit (10) comprises a first frame (27). The second work unit (11) comprises a second frame (28). The first frame (27), respectively the second frame (28), is rigid and free of sections articulated to each other. The first frame (27) comprises a first beam (32). The second frame (28) comprises a second beam (33). During work, the first beam (32), respectively the second beam (33), extends substantially perpendicularly to the direction of advance (A). In addition, it extends above the work elements (15, 16, 17) of the corresponding work unit (10, 11). From a top view of the machine (1) during work, the first beam (32), respectively the second beam (33), extends substantially between the lateral ends of the bar (19) carrying the work elements (15, 16, 17) of the corresponding work unit (10, 11). As can be seen from FIG. 4, the first beam (32) comprises, at its lateral end next to the second lateral end (7) of the arm (5), a first angular gear (34). This first angular gear (34) carries the first work element (16) and makes it possible to drive it around its rotation axis (18). The second beam (33) comprises, at its lateral end next to the second lateral end (7) of the arm (5), a second angular gear (35). This second angular gear (35) carries the second work element (17) and makes it possible to drive it around its rotation axis (18).

The first frame (27) is carried by the arm (5) in particular by means of a first bearing (29) connected to the first frame (27). This first bearing (29) has as its axis the first geometric axis (25). The fixed part (36) of this first bearing (29) is connected to the drive mechanism (14), while the revolving part (37) of this first bearing (29) is connected to the first frame (27). According to the example embodiment in FIG. 4, the fixed part (36) of the first bearing (29) is connected to the housing (20). The revolving part (37) is connected to the first angular gear (34). The first outlet (21) of the housing (20) is connected to a first shaft (38) passing through the first bearing (29) and extending towards transmission means (39) housed inside the first angular gear (34). The housing (20) and the first angular gear (34) are connected to each other in a substantially sealed manner by means of the first bearing (29). The first shaft (38) is therefore advantageously protected from dirt. In addition, the risk of plants becoming coiled around the first shaft (38) during work is eliminated. The first shaft (38) is coaxial to the first geometric axis (25). Such an arrangement prevents the need for a sliding and/or articulated linkage (splines, cardan) at the level of the movement transmission between the first outlet (21) and the first angular gear (34). According to a similar arrangement, the second frame (28) is carried by the arm (5) in particular by means of another first bearing (30) connected to the second frame (28). This other first bearing (30) has as its axis the second geometric axis (13). The fixed part (40) of this other first bearing (30) is connected to the drive mechanism (14), while the revolving part (41) of this other first bearing (30) is connected to the second frame (28). According to the example embodiment in the figures, the fixed part (40) of the other first bearing (30) is connected to the housing (20). The revolving part (41) is connected to the second angular gear (35). The second outlet (22) of the housing (20) is connected to a second shaft (42) passing through the other first bearing (30) and extending towards transmission means (43) housed inside the second angular gear (35). The housing (20) and the second angular gear (35) are connected to each other in a substantially sealed manner by means of the other first bearing (30). The second shaft (42) is therefore advantageously protected from dirt. In addition, the risk of plants becoming coiled around the second shaft (42) during work is eliminated. The second shaft (42) is coaxial to the second geometric axis (13). Such an arrangement prevents the need for a sliding and/or articulated linkage (splines, cardan) at the level of the movement transmission between the second outlet (22) and the second angular gear (35).

As shown in FIGS. 4 and 5, the first frame (27) is carried by the arm (5) also by means of a second bearing (31) connected to the first bearing (29) and to the arm (5). The fixed part (44) of this second bearing (31) is connected to the arm (5), while the revolving part (45) of this second bearing (31) is connected to the drive mechanism (14). According to the example embodiment, the revolving part (45) of the second bearing (31) is connected to the housing (20). Consequently, the revolving part (45) of the second bearing (31) is connected to the fixed part (36) of the first bearing (29). In addition, the housing (20) has a swivel mounting on the arm (5) by means of the second bearing (31) having as its axis the swivel pin (26). As such, the drive mechanism (14), in addition to ensuring drive to the work elements (15, 16) of the first work unit (10), forms a carrier element for the first work unit (10). Via this carrier element, the first frame (27) of the first work unit (10) is directly carried by the arm (5). This design makes it possible to reduce the weight of the machine (1), more specifically the weight of the elements suspended relative to the chassis (2). The drive mechanism (14) and the first frame (27) form a rigid assembly rotating in a plane perpendicular to the swivel pin (26). The drive mechanism (14) therefore follows the movements that the first working unit (10) makes around the swivel pin (26). According to a similar arrangement, the second frame (28) is carried by the arm (5) by means of the second bearing (31) also connected to the other first bearing (30). In fact, the revolving part (45) of the second bearing (31) is connected, via the housing (20), to the fixed part (40) of the other first bearing (30). As such, the drive mechanism (14), in addition to ensuring drive to the work elements (15, 17) of the second work unit (11), forms a carrier element for the second work unit (11). Via this carrier element, the second frame (28) of the second work unit (11) is directly carried by the arm (5). The drive mechanism (14) and the second frame (28) form a rigid assembly rotating in a plane perpendicular to the swivel pin (26). The drive mechanism (14) therefore follows the movements that the second work unit (11) makes around the swivel pin (26).

As such, according to an advantageous feature of the invention, the second articulation device (12) is configured so that in a position of the arm (5) in which the latter extends laterally relative to the chassis (2), in particular in the work position of the arm (5):

the drive mechanism (14) and the first work unit (10) can jointly swivel around the swivel pin (26);

and the drive mechanism (14) and the second work unit (11) can jointly swivel around the swivel pin (26).

As such, this eliminates the need for the drive mechanism (14) to have a multitude of articulations and/or a sliding linkage at the level of the transmission of movement to the work elements (15, 16) of the first work unit (10), as well as to those of the second work unit (11). In addition, each work unit (10, 11) can swivel around the swivel pin (26) if the work mechanism (9) collides with an obstacle. The joint swiveling of the drive mechanism (14) and this work unit (10, 11) prevents the impacts and jolts experienced by the work mechanism (9) from being transmitted to the moving parts of the drive mechanism (14).

According to the example embodiment of the invention, the first work unit (10), the second work unit (11) and the drive mechanism (14) can jointly swivel around the swivel pin (26). During work, the resistant forces experienced by the first work unit (10), and which tend to cause it to swivel to the rear relative to the arm (5), are thus, to a greater or lesser extent, offset by the resistant forces simultaneously experienced by the second work unit (11). The invention states in particular that the drive mechanism (14), the first frame (27) and the second frame (28) form a rigid assembly rotating in a plane perpendicular to the swivel pin (26).

According to an advantageous feature of the invention, the first geometric axis (25) of the first work unit (10) intersects at least substantially the swivel pin (26). This feature in particular enables the inlet (23) of the housing (20) to be connected to a second transmission shaft (46) coaxial to the swivel pin (26) and to install, inside the housing (20), a first bevel gear (47) between this second transmission shaft (46) and the first shaft (38). This feature also makes it possible to reduce the mechanical stresses experienced by the drive mechanism (14), in particular by the second bearing (31) and the housing (20), when the first work unit (10) swivels around the first geometric axis (25). According to the example embodiment, the first geometric axis (25) intersects the swivel pin (26).

According to another advantageous feature of the invention, the second geometric axis (13) of the second work unit (11) intersects at least substantially the swivel pin (26). This feature in particular enables the inlet (23) of the housing (20) to be connected to the second transmission shaft (46) and to install, inside the housing (20), a second bevel gear (48) between this second transmission shaft (46) and the second shaft (42). This feature also makes it possible to reduce the mechanical stresses experienced by the drive mechanism (14), in particular by the second bearing (31) and the housing (20), when the second work unit (11) swivels around the second geometric axis (13). According to the example embodiment, the second geometric axis (13) intersects the swivel pin (26).

It is also noteworthy, in the example embodiment in FIGS. 4 and 5, that each of the first and second geometric axes (25 and 13) intersects at least substantially the swivel pin (26). Furthermore, the first and second geometric axes (25 and 13) are aligned.

Figure 6:
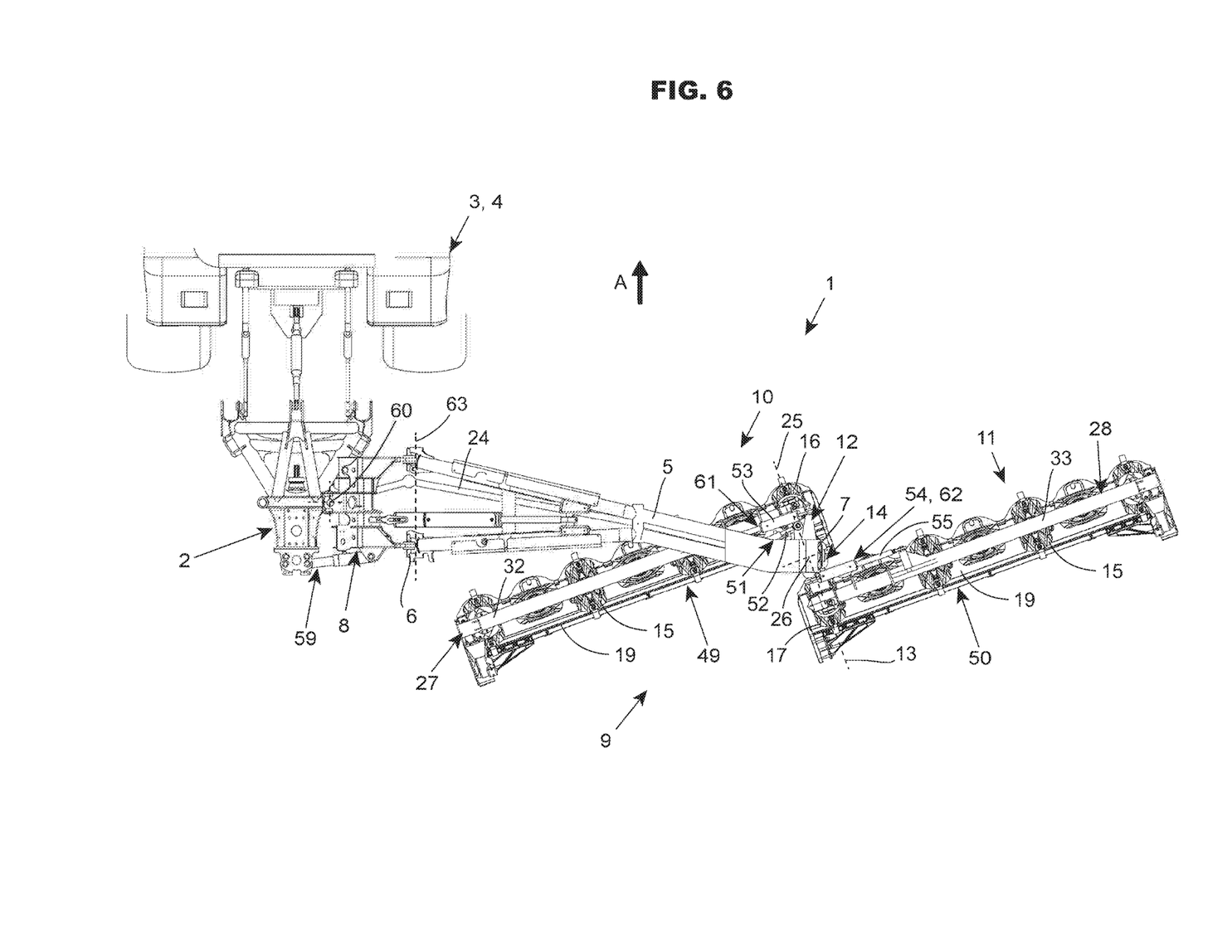
FIG. 6 shows a top view of the example embodiment.

As shown in particular in FIG. 1, the first work unit (10) comprises a first portion (49) positioned, in the work position of the arm (5) and in a direction perpendicular to the direction of advance (A), between the first lateral end (6) and the second lateral end (7). During work, this first portion (49) occupies a first work position. According to the example embodiment, in this first work position, the first portion (49) extends substantially perpendicularly to the direction of advance (A). According to an advantageous feature of the invention, in a position of the arm (5) in which the latter extends laterally relative to the chassis (2), the first portion (49) can leave the first work position by means of a first swiveling to the rear relative to the arm (5) around the swivel pin (26). This first swiveling can in particular occur in the work position of the arm (5). This first swiveling to the rear places the first portion (49) of the first work unit (10) in a position relative to the arm (5) that is shown in FIGS. 4 and 6. This position is a safety position that the first work unit (10) can return to when the first portion (49) encounters an obstacle. This can in particular occur in the event of a collision between this obstacle and a work element (15, 16) and/or the frame (27) of the first portion (49).

As shown in particular in FIG. 1, the second work unit 1) comprises a second portion (50) positioned, in the work position of the arm (5) and in a direction perpendicular to the direction of advance (A) and oriented from the first lateral end (6) towards the second lateral end (7), beyond the second lateral end (7). During work, this second portion (50) occupies a second work position. According to the example embodiment, in this second work position, the second portion (50) extends substantially perpendicularly to the direction of advance (A). FIG. 6 shows that in a position of the arm (5) in which the latter extends laterally relative to the chassis (2), the second portion (50) can leave the second work position by means of a second swiveling forwards relative to the arm (5) around the swivel pin (26). This second swiveling can in particular occur in the work position of the arm (5) visible in FIG. 6.

According to the example embodiment, the first swiveling and the second swiveling are connected to each other. The first swiveling causes the second swiveling. In fact, the first frame (27) and the second frame (28) form a rigid assembly rotating in a plane perpendicular to the swivel pin (26).

The machine (1) according to the invention advantageously comprises a first activation means (51) positioned between the arm (5) and the first or second work unit (10, 11). The first activation means (51) allows the first swiveling of the first portion (49), only when a force exerted on the first portion (49) causes a force on the first activation means (51) exceeding a first determined threshold. As such, during work, the first activation means (51) normally maintains the first portion (49) in an orientation substantially perpendicular to the direction of advance (A). However, in the event of a collision with an obstacle that exerts on the first activation means (51) a force higher than the first threshold, the first portion (49) can move towards its safety position. According to the example embodiment in FIG. 4, the first activation means (51) comprises a trigger jack (52) connected to the arm (5) and to the first frame (27), more specifically to the arm (5) and the housing (20) of the drive mechanism (14).

According to an advantageous feature of the invention, when the first activation means (51) allows the first swiveling of the first portion (49), the first activation means (51) causes an additional upwards swiveling of the first portion (49) around the first geometric axis (25). As such, the work elements (15, 16) of the first portion (49) are lifted off the ground and can pass above an obstacle, such as a stone or tree stump, that caused the activation. Possible damage to the first work unit (10) is therefore significantly reduced. According to the example embodiment shown in FIG. 4, a first jack (53) is articulated between the first frame (27) and the arm (5) or the drive mechanism (14). A variation in the length of this first jack (53) causes the first work unit (10) to swivel around the first geometric axis (25). The first jack (53) is hydraulically connected to the trigger jack (52). As such, when the trigger jack (52) allows the first swiveling around the swivel pin (26), it controls the first jack (53) to simultaneously lift the first portion (49) around the first geometric axis (25).

According to an advantageous feature of the machine (1), it comprises a second activation means (54) positioned between the arm (5) and the first or second work unit (10, 11). When the second portion (50) performs the second swiveling, the second activation means (54) causes an additional upwards swiveling of the second portion (50) around the second geometric axis (13). This additional upwards swiveling of the second portion (50) reduces its ground friction surface and therefore facilitates the related swiveling of the first portion (49) backwards around the swivel pin (26). Furthermore, the additional upwards swiveling of the second portion (50) reduces the risk of the second portion (50) colliding, during its second forward swiveling, with an obstacle situated in front of the machine (1). According to the example embodiment in FIG. 4, a second jack (55) is articulated between the second frame (28) and the arm (5) or the drive mechanism (14). A variation in the length of this second jack (55) causes the second work unit (11) to swivel around the second geometric axis (13). The second jack (55) is hydraulically connected to the trigger jack (52). As such, when the trigger jack (52) allows the first swiveling around the swivel pin (26), it controls the second jack (55) to simultaneously lift the second portion (50) around the second geometric axis (13).

According to an advantageous feature of the invention, the machine (1) comprises a stop means (56) allowing the first backward swiveling of the first portion (49) of the first work unit (10) from the first work position. Conversely, the stop means (56) limits, or prevents, a forward swiveling of the first portion (49) relative to the arm (5), around the swivel pin (26), from the first work position. As such, the stop means (56) prevents the first portion (49) colliding with the parts of the chassis (2) situated in front of the machine (1) and/or with parts of the motor vehicle (3). This advantageous effect will become clear when examining FIG. 6, which shows a wheel of the tractor (4) placed in front of the first lateral end (6) of the arm (5). According to the example embodiment, the stop means (56) prevents such a collision between the work element (15) closest to the chassis (2) and the wheel of the tractor (4) positioned on the same side. According to the depiction shown in FIG. 4, the stop means (56) comprises for example a first part (57) connected to the drive mechanism (14) and a second part (58) connected to the arm (5). These two parts (57 and 58) can swivel relative to each other around the swivel pin (26), freely in one direction but in a limited manner in the other direction.

Figure 7:
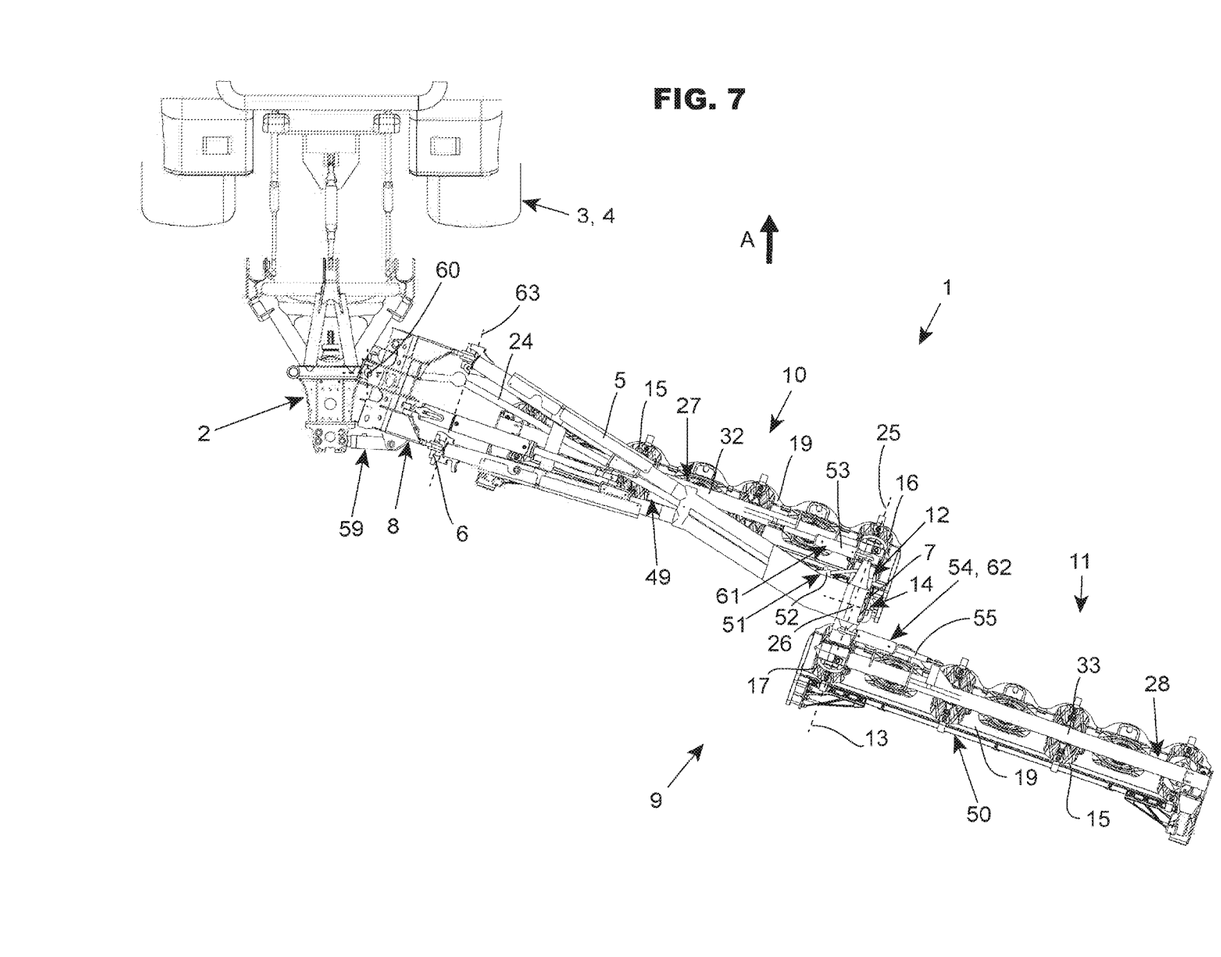
FIG. 7 shows another top view of the example embodiment.

The stop means (56) can besides be configured to limit, or prevent, a backward swiveling of the second portion (50) relative to the arm (5), around the swivel pin (26), from a second position relative to the arm (5) occupied by the second portion (50) during the work of the machine (1). As such, if, during work, the second portion (50) collides with an obstacle situated in front of it, the second work unit (11) retains its position initially occupied relative to the arm (5). To protect the second work unit (11) in such an event, the invention provides a third activation means (59) connected to the chassis (2). This third activation means (59) allows the arm (5) to move backwards relative to the motor vehicle (3) when a force exerted on the arm (5) causes a force on the third activation means (59) exceeding a third determined threshold. As such, if the second portion (50) collides with an obstacle placed in front of it, the second work unit (11) can swivel backwards relative to the motor vehicle (3), around an axis (60) directed upwards and situated for example at the level of the chassis (2). The arm (5) and the second work unit (11) are thus oriented as shown in FIG. 7. According to the example embodiment in this figure, the third activation means (59) is articulated between the arm (5) and the chassis (2). It comprises for example a jack. The first articulation device (8) connecting the arm (5) to the chassis (2) comprises the axis (60) directed upwards around which the arm (5) can swivel backwards. In addition, the invention can anticipate that during work, a collision of the first portion (49) with an obstacle causes a related activation of the first and third activation means (51 and 59). In this case, the first portion (49) swivels backwards relative to the arm (5), around the swivel pin (26) (FIG. 6), while the arm (5) swivels backwards relative to the motor vehicle (3) (FIG. 7).

According to an advantageous feature of the invention, the second articulation device (12) allows each of the first and second work units (10 and 11) to swivel relative to the arm (5) in a work position, around its respective first or second geometric axis (25, 13), upwards and downwards from a horizontal position, independently of the other of the first and second work units (10 and 11). This feature is shown in particular in FIG. 2. As such, each work unit (10, 11) is able to properly follow the relief of the ground. Thanks to the independence of the respective swiveling movements, the work mechanism (9) is well adapted to the soil, also with wide work units (10 and 11).

To present a good quality of work, the machine (1) comprises a lightening means (61, 62) for the first and second work units (10 and 11). This is positioned between the arm (5) and at least one of the first and second work units (10 and 11). According to the example embodiment, a first lightening means (61) is articulated between the first frame (27) and the arm (5) or the drive mechanism (14). A second lightening means (62) is articulated between the second frame (28) and the arm (5) or the drive mechanism (14). As shown in FIG. 4, the first lightening means (61) comprises for example the first jack (53), while the second lightning means (62) comprises for example the second jack (55).

According to an advantageous feature, the machine (1) is transposed from a work configuration (FIG. 1) to a manoeuvre and/or transportation configuration (FIG. 3) by respective swiveling movements in the same direction of the second work unit (11) relative to the arm (5) and of the arm (5) relative to the chassis (2). The manoeuvre configuration, not shown, is for example used to bring the first and second work units (10 and 11) to pass over an obstacle or windrow. It is situated between the work configuration and transport configuration.

According to the example embodiment, the first articulation device (8) comprises an articulation axis (63). In the work position of the arm (5), the articulation axis (63) is substantially oriented in the direction of advance (A). During work, the arm (5) can swivel upwards and downwards around the articulation axis (63), so that the first and second work units (10 and 11) move vertically to follow the relief of the ground. To switch from the work configuration to the manoeuvre and/or transport configuration, the arm (5) is swiveled upwards relative to the chassis (2) around the articulation axis (63). To switch from the work configuration to the manoeuvre and/or transport configuration, the second work unit (11) is swiveled relative to the arm (5) in the same direction as the arm (5) relative to the chassis (2), namely upwards around the second geometric axis (13). This kinematics enables, for manoeuvres and/or transport, the second work unit (11) to be lifted off the ground in significant proportions. Furthermore, this kinematics enables easy transposition of the machine (1) to the manoeuvre and/or transport configuration even when it is on ground raised on the side where the second work unit is located (It).

According to an advantageous feature, the machine (1) is transposed from the work configuration to the transport configuration by respective swiveling movements in the same direction:

of the second work unit (11) relative to the arm (5), of an angle between 90° and 180°, around the second geometric axis (13);

and of the arm (5) relative to the chassis (2) around the articulation axis (63).

As such, in the transport configuration of the machine (1), the work mechanism (9) is reduced in terms of its width. With the arm (5) folded upwards relative to the chassis (2), the work mechanism (9) is reduced in terms of its height, by around half of its total working width. According to the example embodiment in FIG. 3; the arm (5) extends substantially vertically or slightly beyond vertical in the transport configuration of the machine (1). The second work unit (11) is swiveled around the second geometric axis (13) by an angle of around 180°. This swiveling of around 180° is facilitated by the gap between the first and second work units (10 and 11) in the direction of advance (A). This same gap enables the second work unit (11), folded by around 180°, to extend behind the arm (5) and to fall more or less within the bulk of the latter, seen from the rear of the machine (1).

According to another advantageous feature, the machine (1) is transposed from the work configuration to the transport configuration:

by the upwards swiveling of the second work unit (11) relative to the arm (5) in work position; around the second geometric axis (13), of an angle between 90° and 180°;

then by the upwards swiveling of the arm (5) relative to the chassis (2).

As such; the transposition from the work configuration to the transport configuration comprises a first phase in which the first work unit (10) remains on the ground. During this first phase, the second work unit (11) is swiveled around the second geometric axis (13). According to the example embodiment, the angle of this swiveling is around 180°. The second work unit (11) then moves to the position it ultimately occupies relative to the arm (5) in the transport configuration of the machine (1). As such, the second work unit (11) can be swiveled without the machine (1) becoming destabilised, as the first work unit (10) serves as a support on the ground. Only in a second phase, the arm (5) is swiveled upwards around the articulation axis (63). The additional stability afforded by this sequencing of movements allows work units (10 and 11) of a larger width and/or work units (10 and 11) that, during work, are significantly laterally offset relative to the motor vehicle (3). This sequencing also makes it possible to reduce the power that the machine (1) or the motor vehicle (3) must provide to control the actuators necessary for the transposition from the work configuration to the transport configuration.

According to the example embodiment, the machine (1) according to the invention can include, apart from an arm (5) and two work units (10 and 11) positioned on one side of the chassis (2), a second arm (5') carrying two other work units (10' et 11') positioned on the other side of the chassis (2). Such a design makes it possible to achieve a very wide working width, for example of between ten and fifteen meters.

Of course, the invention is not limited to the example embodiment described and shown in the attached figures. Modifications remain possible, in particular concerning the composition, arrangement or number of the various elements, through a different combination of the aforementioned features or by substituting technical equivalents without departing from the scope of protection of the invention.

The invention claimed is:

1. An agricultural machine for harvesting plants, comprising:
   a chassis that can be attached to a motor vehicle movable in a direction of advance;
   an arm connected to the chassis and extending between a first lateral end of the arm and a second lateral end of the arm;
   a first articulation device connecting the arm to the chassis in vicinity of the first lateral end, the first articulation device allowing the arm to be moved relative to the chassis:
      between a work position, in which the arm extends laterally relative to the chassis, and
      a transport position, in which the arm is swiveled relative to the chassis so that, perpendicularly to the direction of advance, it is smaller in size than in the work position;
   a first work unit connected to the arm and extending, in the work position of the arm and in a direction perpendicular to the direction of advance, from the second lateral end towards the first lateral end;
   a second work unit connected to the arm and extending, in the work position of the arm and in a direction perpendicular to the direction of advance and oriented from the first lateral end towards the second lateral end, from the second lateral end of the arm;
   a second articulation device carried by the arm in vicinity of the second lateral end;
      the second articulation device connecting the second work unit to the arm in vicinity of the second lateral end;
      the second articulation device allowing the second work unit to swivel relative to the arm around a second geometric axis situated in vicinity of the second lateral end and oriented, when the arm is in a work position, substantially in the direction of advance;
   a drive mechanism configured to drive work elements of the first and second work units, carried by the arm in vicinity of the second lateral end;
   wherein
   the second articulation device connects the first work unit to the arm in vicinity of the second lateral end;
   the second articulation device allows, during work, the first work unit to swivel relative to the arm around a first geometric axis situated in vicinity of the second lateral end and oriented, when the arm is in work position, substantially in the direction of advance;
   the second articulation device includes a swivel pin oriented upwards in the work position of the arm;
   the drive mechanism includes a swivel mounting on the arm around the swivel pin;
   the drive mechanism and at least one of the first and second work units can, in a position of the arm in which the at in extends laterally relative to the chassis, jointly swivel around the swivel pin.

2. A machine according to claim 1, wherein
   the at least one of the first and second work units comprises a frame;
   the frame carries at least one work element that can be driven in rotation relative to the frame by the drive mechanism and around a rotation axis that remains, during work, at least substantially immobile relative to the frame;
   the frame is carried by the arm, in an articulated manner, by a first bearing connected to the frame and having as its axis the corresponding first or second geometric axis of the at least one of the first and second work units, and of a second bearing connected to the first bearing and the arm and having as its axis the swivel pin.

3. A machine according to claim 1, wherein the corresponding first or second geometric axis of the at least one of the first and second work units intersects at least substantially the swivel pin.

4. A machine according to claim 1, wherein the second articulation device is configured so that in a position of the arm in which the arm extends laterally relative to the chassis:
   the drive mechanism and the first work unit can jointly swivel around the swivel pin;
   and the drive mechanism and the second work unit can jointly swivel around the swivel pin.

5. A machine according to claim 1, wherein
   the first work unit includes a first portion positioned, in the work position of the arm and in a direction perpendicular to the direction of advance, between the first lateral end and the second lateral end;
   in a position of the arm in which the arm extends laterally relative to the chassis, the first portion can leave a first work position by a first swiveling backwards relative to the arm around the swivel pin.

6. A machine according to claim 1, wherein
the second work unit includes a second portion positioned, in the work position of the arm and in a direction perpendicular to the direction of advance and oriented from the first lateral end towards the second lateral end, beyond the second lateral end;
in a position of the arm in which the arm extends laterally relative to the chassis, the second portion can leave a second work position by a second swiveling forwards relative to the arm around the swivel pin.

7. A machine according to claim 5, further comprising:
a first activation means positioned between the arm and the first or second work unit;
the first activation means allows the first swiveling of the first portion of the first work unit, only when a force exerted on the first portion causes a force on the first activation means exceeding a first determined threshold.

8. A machine according to claim 7, wherein when the first activation means allows the first swiveling of the first portion, the first activation means causes an additional upwards swiveling of the first portion around the first geometric axis.

9. A machine according to claim 6, further comprising:
a second activation means positioned between the arm and the first or second work unit;
when the second portion performs the second swiveling, the second activation means causes an additional upwards swiveling of the second portion around the second geometric axis.

10. A machine according to claim 5, further comprising:
a stop means allowing a first backward swiveling of the first portion of the first work unit from the first work position;
the stop means limits a forward swiveling of the first portion relative to the arm, around the swivel pin, from the first work position.

11. A machine according to claim 5, wherein
the second work unit comprises a second portion positioned, in the work position of the arm and in a direction perpendicular to the direction of advance and oriented from the first lateral end towards the second lateral end, beyond the second lateral end; and
the machine further comprises a stop means limiting a swiveling of the second portion backwards relative to the arm, around the swivel pin, from a second position relative to the arm occupied by the second portion during the work of the machine.

12. A machine according to claim 1, wherein the second articulation device allows each of the first and second work units to swivel relative to the arm in work position, around its respective first or second geometric axis, upwards and downwards from a horizontal position, independently of the other of the first and second work units.

13. A machine according to claim 1, further comprising:
a lightening means for the first and second work units positioned between the arm and the at least one of the first and second work units.

14. A machine according to claim 1, wherein the machine is transposed from a work configuration to a manoeuvre configuration and/or a transport configuration by respective swiveling movements in a same direction:
of the second work unit relative to the arm, upwards around the second geometric axis;
and of the arm relative to the chassis, around an articulation axis oriented, in the work position of the arm, substantially in the direction of advance.

15. A machine according to claim 1, wherein the machine is transposed from a work configuration to a transport configuration by respective swiveling movements in a same direction:
of the second work unit relative to the arm, of an angle between 90° and 180°, around the second geometric axis;
and of the arm relative to the chassis, around an articulation axis oriented, in the work position of the arm, substantially in the direction of advance.

16. A machine according to claim 1, wherein the machine is transposed from a work configuration to a transport configuration:
by the upwards swiveling of the second work unit relative to the arm in a work position, around the second geometric axis, of an angle between 90° and 180°;
then by the upwards swiveling of the arm relative to the chassis.

* * * * *